United States Patent [19]

Inoue et al.

[11] Patent Number: 4,592,566
[45] Date of Patent: Jun. 3, 1986

[54] COUPLING MECHANISM FOR KING PIN

[75] Inventors: Akira Inoue, Kitakyushu; Tadao Otsuka, Nishinomiya, both of Japan

[73] Assignees: Kyokuto Kaihatsu Kogyo Co, Ltd., Hyogo; Hitachi Metals, Ltd., Tokyo, both of Japan

[21] Appl. No.: 629,071

[22] Filed: Jul. 9, 1984

[51] Int. Cl.$^4$ .................. B62D 53/10; B62D 53/12
[52] U.S. Cl. .................... 280/433; 280/435
[58] Field of Search ............. 280/433, 434, 435, 436, 280/437, 438 R, 440; 403/317, 318; 410/62, 64

[56] References Cited

U.S. PATENT DOCUMENTS

| | | | |
|---|---|---|---|
| 1,999,375 | 4/1935 | Seyferth et al. | 280/435 |
| 2,469,279 | 5/1949 | Seyferth | 280/435 |
| 2,519,090 | 8/1950 | Winn | 280/435 |
| 3,013,815 | 12/1961 | Geerds | 280/435 |
| 4,008,904 | 2/1977 | Davies | 280/435 |

Primary Examiner—John J. Love
Assistant Examiner—Mitchell J. Hill
Attorney, Agent, or Firm—Wenderoth, Lind & Ponack

[57] ABSTRACT

A coupling mechanism for a king pin, including a plate member formed with an outer peripheral rib, a pair of jaws for receiving the king pin, a locking member for locking the jaws in its king pin engaging position, a lever for moving the locking member into its jaw unlocking position, which is pivotally and axially movably connected with the locking member, and a stopper member for preventing the locking member in its jaw locking position from moving into the jaw unlocking position, which is operatively associated with the lever so as to be pivotally projected into and retracted from between the outer peripheral rib and the locking member in the jaw locking position and in the jaw unlocking position, respectively.

3 Claims, 10 Drawing Figures

COUPLING MECHANISM FOR KING PIN

BACKGROUND OF THE INVENTION

1. Field of the Invention

The present invention generally relates to coupling mechanisms and more particularly, to a king pin coupling mechanism in which a king pin secured to a trailer vehicle is brought into or out of engagement with a fifth wheel member of a tractor vehicle.

2. Description of the Prior Art

Conventionally, in king pin coupling mechanisms, it has been so arranged as shown in FIGS. 1 to 3 that a pair of locking jaws 1 are pivotally supported by a pair of pins 2, respectively, while an engaging piece 3 having a guide rod 15 secured thereto is urged towards a king pin 5 by a spring 4 wound around the guide rod 15 so as to be inserted between head portions 1a of the locking jaws 1. Meanwhile, the guide rod 15 is slidably fitted into a guide hole 7 formed in an outer peripheral rib 6 of a main plate 16 supported on a body of a tractor vehicle (not shown). Furthermore, a lever 8, which extends through a recess 11 of the engaging piece 3 as shown in FIG. 2, has a pivotal pin 9 provided at one end thereof and a grip portion 10 formed at the other end thereof. Moreover, as shown in FIG. 3, a stopper 13 is pivotally supported so as to be pivoted about a pin 12 by a wire 14 attached to the stopper 13. Then, operations and safety of the prior art king pin coupling mechanisms referred to above will be described, hereinbelow. When the king pin 5 is in its coupling position as shown in FIG. 1, the stopper 13 covers the guide hole 7 as shown in FIG. 3 so as to prevent the guide rod 15 from projecting out of the guide hole 7. In order to release the king pin 5 in the coupling position, the wire 14 is initially pulled in the direction of the arrow of FIG. 3, so that the stopper 13 is displaced to a position shown by the imaginary lines of FIG. 3 and thus, the guide hole 7 is exposed, whereby the guide rod 15 is allowed to project out of the guide hole 7. Subsequently, when the grip portion 10 is displaced in the direction of the arrow of FIG. 1, the engaging portion 3 in engagement with the lever 8 is also displaced together with the lever 8 in the direction of the arrow of FIG. 1. Consequently, the engaging piece 3 is disengaged from the head portions 1a of the locking jaws 1, whereby it becomes possible to release the king pin 5 from the locking jaws 1. Since a mechanism for holding the lever 8 and the engaging piece 3 in this state is well known, description thereof is abbreviated.

However, the prior art king pin coupling mechanisms have such an inconvenience that, when a single operator operates them so as to disengage the king pin 5 from the locking jaws 1, he is required to operate the lever 8 by one hand while pulling the wire 14 by the other hand, which is extremely difficult.

Furthermore, the known king pin coupling mechanisms have such a disadvantage that, since the pin 12, stopper 13 and wire 14 are provided outside the outer peripheral rib 6 of the main plate 16, there is a strong possibility of damage thereto. Especially, in the case where the tractor and trailer vehicles run along a curve, the wire 14 is readily cut upon its contact with the bodies of the vehicles, thereby resulting in a fatal accident upon disconnection of the trailer vehicle from the tractor vehicle. Thus, the prior art king pin coupling mechanisms are undesirable from the standpoints of operational efficiency and safety.

SUMMARY OF THE INVENTION

Accordingly, an essential object of the present invention is to provide an improved coupling mechanism for a king pin, whose components are least subjected to damage such that its operational efficiency and safety is improved, with substantial elimination of the disadvantages inherent in conventional coupling mechanisms of this kind.

Another important object of the present invention is to provide an improved coupling mechanism of the above described type which is highly reliable in actual use.

In accomplishing these and other objects according to one preferred embodiment of the present invention, there is provided an improved coupling mechanism for a king pin, comprising: a plate member formed with an outer peripheral rib; a pair of jaws for receiving said king pin therebetween so as to be coupled with said king pin, which are pivotally mounted on said plate member so as to be pivoted between a king pin engaging position and a king pin disengaging position such that an accommodation opening is defined between said jaws in said king pin engaging position; a locking member for locking said jaws in said king pin engaging position, which is movably provided between said outer peripheral rib and said jaws so as to be moved between a jaw locking position in which said locking member is fitted into said accommodation opening and a jaw unlocking position in which said locking member is retracted from said accommodation opening; a first elastic member which urges said locking member towards said king pin into said jaw locking position so as to insert said locking member into said accommodation opening such that said jaws in said king pin engaging position are locked by said locking member; a lever for moving said locking member into said jaw unlocking position, which is pivotally and axially movably connected with said locking member so as to be moved between a coupling position in which said locking member is held in said jaw locking position and a release position in which said locking member is held in said jaw unlocking position; said lever being formed with an elongated opening; a pin member engageable with said elongated opening, which is mounted on said plate member such that said lever is pivoted about said pin member and axially moved through engagement of said pin member with said elongated opening; a second elastic member for urging said lever into said coupling position; and a stopper means for preventing said locking member in said jaw locking position from moving into said jaw unlocking position, which is operatively associated with said lever so as to be pivotally projected into and retracted from between said outer peripheral rib and said locking member in said jaw locking position and in said jaw unlocking position, respectively, such that said stopper means is brought into and out of engagement with said locking member in said jaw locking position and in said jaw unlocking position, respectively.

In accordance with the present invention, since the stopper means is disposed inside the outer peripheral rib, the stopper means is least subjected to damage.

Furthermore, in accordance with the present invention, since the stopper means is operatively associated with the lever, the lever and the stopper means can be operated by a single hand easily and reliably.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
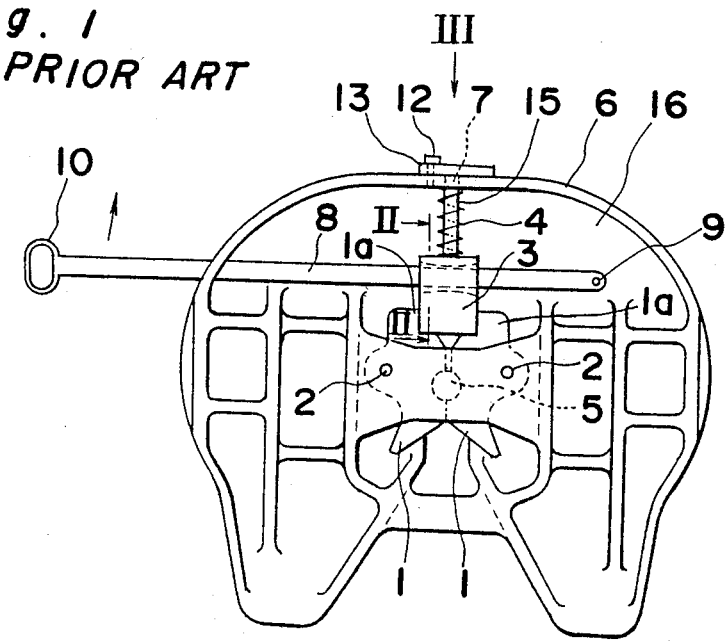
FIG. 1 is a fragmentary bottom plan view of a prior art king pin coupling mechanism (already referred to)
Figure 2:
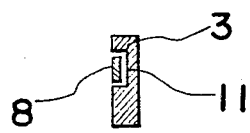
FIG. 2 is a cross-sectional view taken along the line II—II in FIG. 1 (already referred to)
Figure 3:
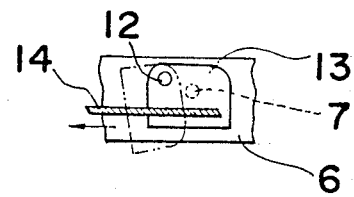
FIG. 3 is a view as observed in the direction of the arrow III in FIG. 1 (already referred to)
Figure 4:
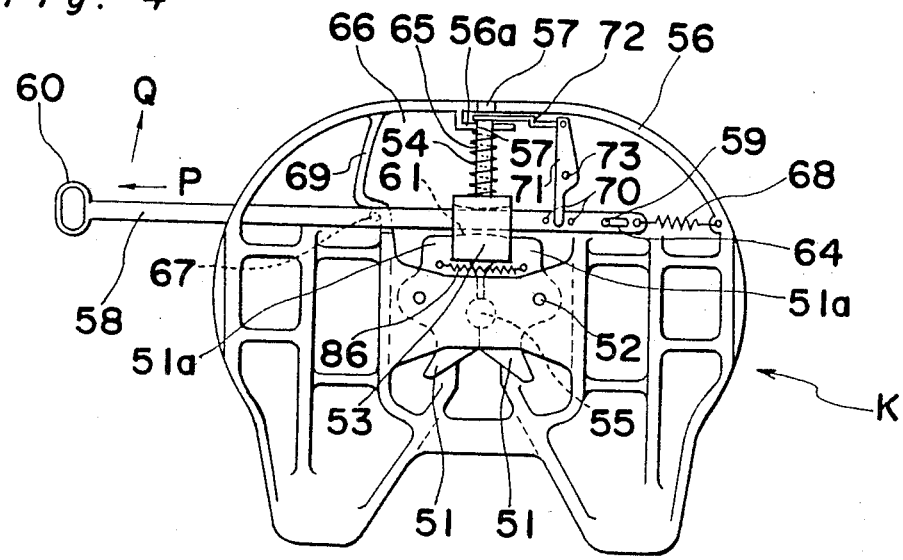
FIG. 4 is a view similar to FIG. 1, particularly showing a king pin coupling mechanism according to the present invention at the time when its lever is in a coupling position.

Referring now to the drawings, there is shown in FIG. 4, a king pin coupling mechanism K according to the present invention. The coupling mechanism K includes a pair of locking jaws 51, a pair of pins 52, an engaging piece 53 having a guide rod 65 secured thereto, a spring 54 wound around the guide rod 65, and a main plate 66 formed with an outer peripheral rib 56. The locking jaws 51 are pivotally supported by the pins 52, respectively. The engaging piece 53 is urged towards a king pin 55 by the spring 54 so as to be inserted between head portions 51a of the locking jaws 51. A projecting rib 56a is provided adjacent to and inside the outer peripheral rib 56 so as to confront the outer peripheral rib 56. A guide hole 57 is formed in the outer peripheral rib 56 and the projecting rib 56a such that the guide rod 65 is slidably fitted into the guide hole 57.

The coupling mechanism K further includes a lever 58 and a spring 68. The lever 58 in engagement with a recess 61 of the engaging piece 53 has an elongated opening 64 formed at one end thereof and a grip portion 60 provided at the other end thereof such that a pivotal pin 59 secured to the main plate 66 is fitted into the elongated opening 64. The lever 58 is at all times urged in the rightward direction in FIG. 4 by the spring 68. The lever 58 further has a projection 67 formed at an arbitrary portion thereof. A guide rib 69 engageable with the projection 67 and having a radius of curvature substantially equal to a distance between the projection 67 and the pivotal pin 59 is formed on the main plate 66.

Furthermore, a pair of protrusions 70 are provided on the lever 58 so as to be interposed between the engaging piece 53 and the elongated opening 64. A pivotal lever 71 which is pivotally supported by a pin 73 is disposed, at one end thereof, between the protrusions 70 so as to be brought into engagement therewith and is coupled, at the other end thereof, with a stopper 72 such that the stopper 72 is disposed between the outer peripheral rib 56 and the guide rod 65.

Figure 5:
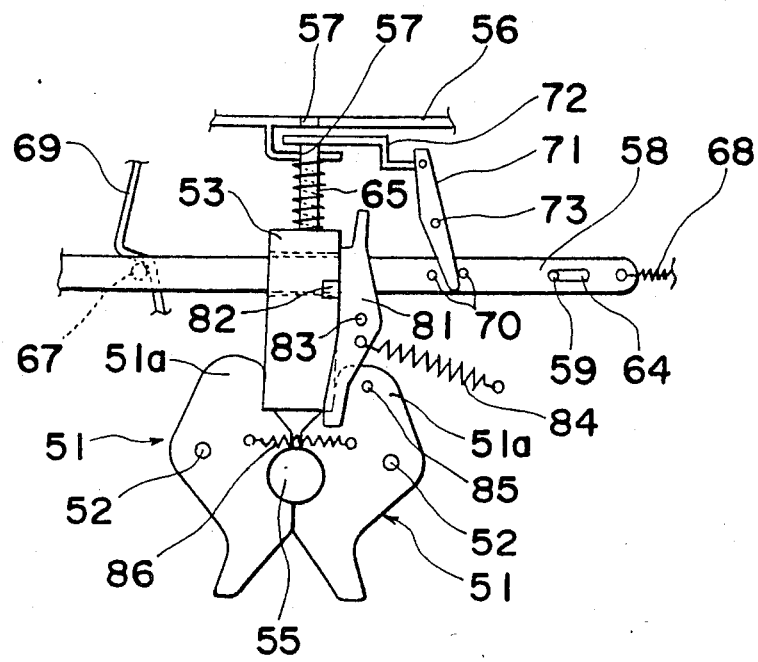
FIG. 5 is a cutaway bottom plan view showing, on an enlarged scale, a main portion of the king pin coupling mechanism of FIG. 4 at the time when its lever is in the coupling position.
Figure 6:
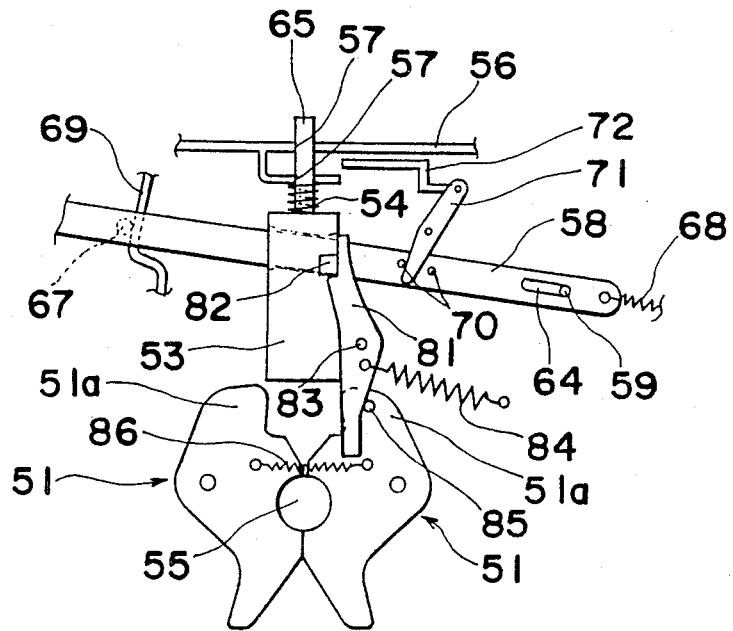
FIGS. 6 and 7 are views similar to FIG. 5, particularly showing the king pin coupling mechanism of FIG. 4 at the time when its lever is in a release position and in a neutral position between the coupling position and the release position, respectively.
Figure 7:
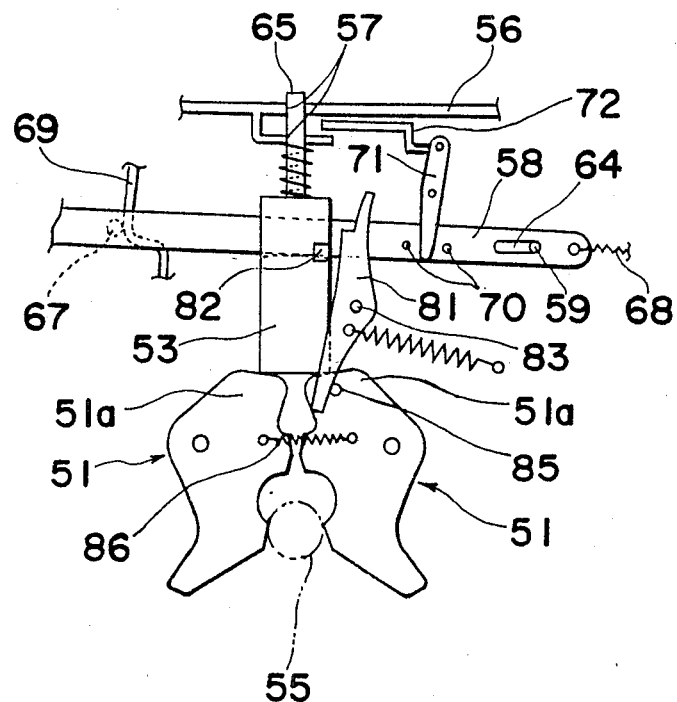

Operations of the coupling mechanism K will be described with reference to FIGS. 5 to 7, hereinbelow. The coupling mechanism K further includes a pivotal lever 81 pivotally supported by a pin 83, a boss 82 formed on the engaging piece 53, a spring 84 for urging the pivotal lever 81 in the counterclockwise direction in FIG. 5, a stop pin 85 engageable with the pivotal lever 81, and a spring 86 for urging the locking jaws 51 towards each other. In FIG. 5, a body portion of the pivotal lever 81 is brought into pressing contact with the boss 82 by the spring 84 and the lever 58 is in a,coupling position for holding the engaging piece 53 in a jaw locking position in which the engaging piece 53 is fitted between the head portions 51a of the locking jaws 51. Meanwhile, in FIG. 6, a recessed portion of the pivotal lever 81 is engaged with the boss 82 and the lever 58 is in a release position for holding the engaging piece 53 in a jaw unlocking position in which the engaging piece 53 is retracted from between the head portions 51a of the locking jaws 51. Furthermore, in FIG. 7, the pivotal lever 81 is retracted from the boss 82 and the lever 58 is in a neutral position between the coupling position of FIG. 5 and the release position of FIG. 6. In order to disengage the king pin 55 from the locking jaws 51 in a king pin engaging position (FIG. 5), the lever 58 is initially pulled, by holding the grip portion 60, leftwards, i.e. in the direction of the arrow P (FIG. 4) against the urging force of the spring 68 until the pivotal pin 59 is brought into contact with a right end of the elongated opening 64. Consequently, since the protrusions 70 are also displaced leftwards together with the lever 58, the pivotal lever 71 is pivoted about the pin 73 in the clockwise direction, so that the stopper 72 is retracted rightwards from between the outer peripheral rib 56 and the guide rod 65. Subsequently, when the lever 58 is displaced upwardly, i.e. in the direction of the arrow Q in FIG. 4, the projection 67 secured to the lever 58 moves along the guide rib 69. At the same time, the engaging piece 53 is displaced upwardly against the urging force of the spring 54, so that the engaging piece 53 is disengaged from the head portions 51a of the locking jaws 51. At this time, as shown in FIG. 6, the lever 58 is maintained in the release position through engagement of the recessed portion of the pivotal lever 81 with the boss 82 and the guide rod 65 is projected out of the guide hole 57 of the outer peripheral rib 56 as shown in FIG. 6. Thereafter, when a tractor vehicle is caused to advance forwardly, the king pin 55 secured to a trailer vehicle forcibly pushes the locking jaws 51 open and thus, is disengaged from the locking jaws 51 as shown in FIG. 7. In FIG. 7, the head portions 51a of the locking jaws 51 are depressed by the engaging piece 53 and thus, the locking jaws 51 are held in a king pin disengaging position.

As is clear from the foregoing description, in order to change over the lever 58 from the coupling position of FIG. 5 to the release position of FIG. 6, the changeover can be performed merely by moving the lever 58 leftwards and then, upwardly. Namely, the changeover can be performed by manipulating the single operating member with a single hand. Although the lever 58 is urged rightwards in FIG. 4 by the spring 68, the projection 67 is in sliding contact with the guide rib 69 when the lever 58 is displaced upwardly, so that a large force for pulling the lever 58 leftwards in FIG. 4 is not required and thus, it becomes possible to manipulate the lever 58 easily.

Since the projection 67 secured to the lever 58 is engaged with a curved portion of the guide rib 69 in the coupling position of the lever 58 as shown in FIG. 5, there is no possibility that the lever 58 is displaced upwardly even if the stopper 72 is accidentally retracted from between the outer peripheral rib 56 and the guide rod 65, thereby ensuring safety of the coupling mechanism K. Furthermore, since the stopper 72 is operatively associated with the lever 58, the stopper 72 is prevented from being displaced independently of the lever 58 and is displaced only upon operation of the lever 58, thus resulting in complete safety of the coupling mechanism K. Moreover, since the stopper 72 is disposed inside the outer peripheral rib 56, the stopper 72 is least subjected to damage from outside of the outer peripheral rib 56, which is one of the most excellent features of the present invention. In addition, since the stopper 72 is operatively associated with the lever 58 through the pivotal lever 71 also in the case of changeover of the lever 58 from the neutral position of FIG. 7 to the coupling position of FIG. 5, the changeover can be performed remarkably smoothly with consequent complete elimination of improper coupling between the king pin 55 and the locking jaws 51.

Namely, the above described effects of the coupling mechanism K of the present invention are summarized as follows.

(1) The changeover of the lever 58 from the coupling position of FIG. 5 to the release position of FIG. 6 can be remarkably easily performed merely by moving the lever 58 leftwards and then, upwardly, i.e. by manipulating the single operating member with a single hand.

(2) Since the stopper 72 is operatively associated with the lever 58 through the pivotal lever 71, it becomes possible to completely eliminate such deficiencies as malfunctions, improper coupling or uncoupling between the king pin 55 and the locking jaws 51, etc.

(3) Since the projection 67 is guided by the guide rib 69 through sliding contact of the projection 67 with the guide rib 69 when the lever 58 is displaced upwardly in FIG. 5, the lever 58 can be easily operated without the need for applying a large force against the urging force of the spring 68.

(4) Since the projection 67 secured to the lever 58 is engaged with the curved portion of the guide rib 69 in the coupling position of the lever 58, there is no possibility that the lever 58 is displaced upwardly even if the stopper 72 is accidentally retracted from between the outer peripheral rib 56 and the guide rod 65, thus securing complete safety of the coupling mechanism K.

(5) Since all the components of the coupling mechanism K are invisible from outside of the coupling mechanism K, outsiders who do not know how to operate the coupling mechanism K cannot operate the coupling mechanism K, thereby ensuring safety of the coupling mechanism K.

(6) Since the stopper 72 is disposed inside the outer peripheral rib 56 of the main plate 66 shown in FIG. 4, the stopper 72 is completely prevented from being damaged from outside of the outer peripheral rib 56.

(7) The locking jaws 51 in the king pin engaging position are prevented by the engaging piece 53 from moving into the king pin disengaging position and, in turn, the engaging piece 53 in the jaw locking position is prevented by the stopper 72 from moving into the jaw unlocking position. Furthermore, the stopper 72 is prevented by the lever 58 from being retracted from between the outer peripheral rib 56 and the guide rod 65. Namely, the locking jaws 51 in the king pin engaging position are prevented by the three locking members from moving into the king pin disengaging position, thus securing complete safety of the coupling mechanism K.

It will be readily understood from the effects (1) to (7) above that the coupling mechanism of the present invention has been remarkably improved in operational efficiency, safety and reliability through its novel construction as compared with prior art coupling mechanisms of this kind.

Figure 8A:
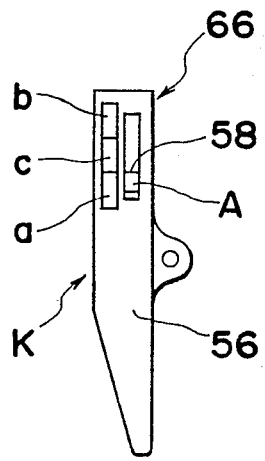
FIGS. 8a, 8b and 8c are side elevational views of the king pin coupling mechanism of FIG. 4 at the time when its lever is in the coupling position, release position and neutral position, respectively.
Figure 8B:
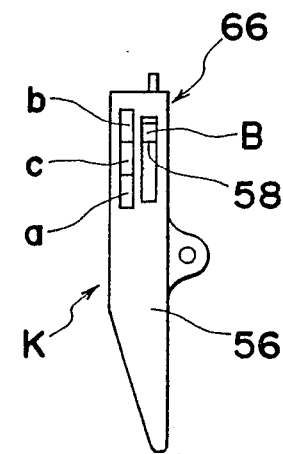
Figure 8C:
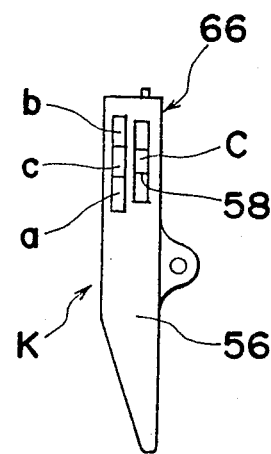

Moreover, it can be so arranged as shown in FIGS. 8a, 8b and 8c that display marks a, b and c for indicating that the lever 58 is in the coupling position (FIG. 5), release position (FIG. 6) and neutral position (FIG. 7), respectively are provided on an outer face of the outer peripheral rib 56 so as to correspond to the coupling position A, release position B and neutral position C of the lever 58, respectively. By the display marks a, b and c, the operator of the coupling mechanism K can easily ensure in which one of the coupling position A, release position B and neutral position C the lever 58 is held, which remarkably improves operational safety of the coupling mechanism K.

The display marks a, b and c may be painted in different colors, for example, blue, red and yellow, respectively so as to enhance operational safety of the coupling mechanism K. Furthermore, the display marks a, b and c may be coated with luminous paint in order to secure safety in the case of operation of the coupling mechanism K at night. Meanwhile, in the case where the display marks a, b and c are so formed as to project out of the outer face of the outer peripheral rib 56, lubricating oil, dust, etc. adhering to the display marks a, b and c can be easily wiped therefrom such that the display marks a, b and c are visible clearly. In addition, the display marks a, b and c are not limited to the color marks described above but characters, numerals, etc. can be employed therefor. It should be noted that the display marks a, b and c can be formed by various methods, e.g. by coating, bonding, casting, marking, etc.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A coupling mechanism for a king pin, comprising:
a main plate member formed with an outer peripheral rib;
a pair of jaws for receiving said king pin therebetween so as to be coupled with said king pin, which are pivotally mounted on said main plate member so as to be pivoted between a king pin engaging positon and a king pin disengaging position such that an accommodation opening is defined between said jaws in said king pin engaging position;

an engaging member for locking said jaws in said king pin engaging positon, which is movably provided between said outer peripheral rib and said jaws so as to be moved between a jaw locking psoition in which said engaging member is fitted into said accommodation opening and a jaw unlocking position in which said engaging member is retracted from said accommodation opening;

a first elastic member for urging said engaging member towards said king pin into said jaw locking position so as to insert said engaging member into said accommodation opening such that said jaws in said king pin engaging position are locked by said engaging member;

a lever means for moving said engaging member into said jaw unlocking position, said lever means being pivotally and axially movably connected with said engaging member so as to be moved between a coupling position in which said engaging member is held in said jaw locking position and a release position in which said engaging member is held in said jaw unlocking position, said lever means being formed with an elongated opening;

a pin member engageable with said elongated opening and mounted on said main plate member such that said lever means is pivoted about said pin member and axially moved through engagement of said pin member with said elongated opening;

a second elastic member for urging said lever means into said coupling position;

a stopper means for preventing said engaging member in said jaw locking position for moving into said jaw unlocking position, said stopper means being operatively associated with said lever means so as to be pivotally projected into and retracted from between said outer peripheral rib and said engaging member in said jaw locking position and in said jaw unlocking position, respectively, such that said stopper means is brought into and out of engagement with said engaging member in said jaw locking position and in said jaw unlocking position, respectively; and a guide pin projection secured to said lever means and a guide rib member engageable with said guide pin projection so that said guide pin projection is in sliding contact with the guide rib member when the lever means is displaced;

said guide rib member having a radius of curvature substantially equal to a distance measured between said pin member and said guide pin projection at the time when said lever means is in said release position.

2. A coupling mechanism as claimed in claim 1, wherein said guide member is a rib.

3. A coupling mechanism as claimed in claim 1, wherein said stopper means includes a stopper and a pivotal lever pivotally mounted on said main plate member, said pivotal lever being engaged, at one end thereof, with said lever main and being coupled, at the other end thereof, with said stopper such that said stopper is pivotally projected into and retracted from between said outer peripheral rib and said engaging member in said jaw locking positon and in said jaw unlocking position, respectively.

* * * * *